US012759778B2

(12) United States Patent
Hongo et al.

(10) Patent No.: US 12,759,778 B2
(45) Date of Patent: Oct. 13, 2026

(54) LAMINATED FILM FOR POUCH, POUCH, AND METHOD FOR MANUFACTURING LAMINATED FILM

(71) Applicant: Toyo Seikan Co., Ltd., Tokyo (JP)

(72) Inventors: Masahiro Hongo, Yokohama (JP); Takashi Miura, Yokohama (JP); Shie Matsunaga, Yokohama (JP); Osamu Gotou, Yokohama (JP); Mayumi Saeki, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 4 days.

(21) Appl. No.: 18/817,584

(22) Filed: Aug. 28, 2024

(65) Prior Publication Data

US 2024/0417150 A1 Dec. 19, 2024

Related U.S. Application Data

(63) Continuation of application No. PCT/JP2023/001491, filed on Jan. 19, 2023.

(30) Foreign Application Priority Data

Apr. 19, 2022 (JP) ................................ 2022-069009

(51) Int. Cl.
*B65D 75/26* (2006.01)
*B32B 3/26* (2006.01)
(Continued)

(52) U.S. Cl.
CPC .............. *B65D 75/26* (2013.01); *B32B 3/266* (2013.01); *B32B 7/12* (2013.01); *B32B 27/08* (2013.01);
(Continued)

(58) Field of Classification Search
CPC .... B65D 75/26; B65D 75/5805; B32B 3/266; B32B 7/12; B32B 27/08; B32B 37/12
(Continued)

(56) References Cited

U.S. PATENT DOCUMENTS

2020/0023093 A1 1/2020 Sordo et al.
2020/0325369 A1 10/2020 Pardal et al.
(Continued)

FOREIGN PATENT DOCUMENTS

JP 61-97149 U 6/1986
JP 2001-18988 * 1/2001
(Continued)

OTHER PUBLICATIONS

International Search Report dated Apr. 11, 2023, issued in counterpart International Application No. PCT/JP2023/001491, w/English translation (5 pages).
(Continued)

*Primary Examiner* — Peter N Helvey
(74) *Attorney, Agent, or Firm* — WHDA, LLP

(57) ABSTRACT

To provide a laminated film for a pouch, a pouch, and a method for manufacturing a laminated film that can favorably facilitate opening using a cut guide line while suppressing a deterioration in barrier performance. A laminated film, for a pouch, includes an intermediate layer film disposed between an inner layer film and an outer layer film, and is formed with a cut guide line. The cut guide line is constituted by a slit portion formed from an outer surface of the intermediate layer film toward an inner surface side of the intermediate layer film. An interposed adhesion portion formed of an adhesive interposed between and in contact with both of a pair of slit-side end surfaces is provided in at least a part of the slit portion formed in the intermediate layer film.

14 Claims, 5 Drawing Sheets

(51) Int. Cl.

| | |
|---|---|
| ***B32B 7/12*** | (2006.01) |
| ***B32B 27/08*** | (2006.01) |
| ***B32B 37/12*** | (2006.01) |
| ***B32B 37/20*** | (2006.01) |
| ***B32B 38/04*** | (2006.01) |
| ***B65D 75/58*** | (2006.01) |

(52) U.S. Cl.
CPC ............ *B32B 37/12* (2013.01); *B32B 37/203* (2013.01); *B32B 38/04* (2013.01); *B65D 75/5805* (2013.01); *B32B 2038/045* (2013.01); *B32B 2307/31* (2013.01); *B32B 2307/54* (2013.01); *B32B 2307/542* (2013.01); *B32B 2439/46* (2013.01)

(58) Field of Classification Search
USPC .......................................................... 383/207
See application file for complete search history.

(56) References Cited

U.S. PATENT DOCUMENTS

| | | | |
|---|---|---|---|
| 2021/0309430 | A1 | 10/2021 | Hongo et al. |
| 2021/0347144 | A1 | 11/2021 | Hongou et al. |
| 2022/0024660 | A1 | 1/2022 | Hongo et al. |

FOREIGN PATENT DOCUMENTS

| | | | | |
|---|---|---|---|---|
| JP | 2001-18988 | A | | 1/2001 |
| JP | 2008-502555 | A | | 1/2008 |
| JP | 2016-150772 | A | | 8/2016 |
| JP | 2019-529276 | | * | 10/2019 |
| JP | 2019-529276 | A | | 10/2019 |
| JP | 2020-121747 | | * | 8/2020 |
| JP | 2020-121747 | A | | 8/2020 |
| JP | 2022-59683 | A | | 4/2022 |
| WO | 2005/123535 | A1 | | 12/2005 |

OTHER PUBLICATIONS

Office Action dated May 19, 2026, issued in counterpart Japanese patent application No. 2022-069009 with English translation (8 pages).
Extended European Search Report dated Mar. 3, 2026, issued in counterpart European patent application No. 23791474.2 (8 pages).
Notice of acceptance for patent application dated Sep. 17, 2025, issued in counterpart Australian patent application No. 2023258155 (3 pages).

* cited by examiner

LAMINATED FILM FOR POUCH, POUCH, AND METHOD FOR MANUFACTURING LAMINATED FILM

TECHNICAL FIELD

The present invention relates to a laminated film for a pouch formed into a bag shape by thermally welding stacked laminated films, a pouch, and a method for manufacturing a laminated film.

BACKGROUND

In the related art, as a laminated film for a pouch formed into a bag shape by thermally welding stacked laminated films, a laminated film in which an inner layer film, an intermediate layer film, and an outer layer film are layered in this order is known.

Further, in such a laminated film for a pouch, it is also known that a cut guide line is formed in the laminated film as a weakened portion that guides cutting (opening) when a user opens the pouch (e.g., see JP 2016-150772 A).

SUMMARY

However, when the cut guide line is formed in the outer layer film as in the laminated film described in JP 2016-150772 A, the pouch has impaired impact resistance or the like. Therefore, to avoid impaired impact resistance, the present applicant has considered forming a slit portion constituting the cut guide line not in the outer layer film but in the intermediate layer film.

However, there are cases where the intermediate layer film has various barrier properties such as barrier properties against gas like oxygen and water vapor in the air. In such a case, forming the slit portion constituting the cut guide line in the intermediate layer film causes barrier performance of the intermediate layer film to decrease, which is a problem.

The present invention has been made to solve the problem described above, and an object of the present invention is to provide a laminated film for a pouch, a pouch, and a method for manufacturing a laminated film, which can favorably facilitate opening using a cut guide line while suppressing a decrease in barrier performance with a simple configuration.

To solve the problem described above, a laminated film according to the present invention is a laminated film, for a pouch, including an intermediate layer film, an inner layer film, and an outer layer film, the intermediate layer film being disposed between the inner layer film and the outer layer film, the pouch being formed with a cut guide line. The cut guide line is constituted by a slit portion formed from an outer surface of the intermediate layer film toward an inner surface side of the intermediate layer film. The intermediate layer film includes a pair of slit-side end surfaces facing each other with the slit portion therebetween, and an interposed adhesive portion formed of an adhesive interposed between and in contact with both the pair of slit-side end surfaces is provided in at least a part of the slit portion formed in the intermediate layer film.

To solve the problem described above, a pouch according to the present invention includes a plurality of the laminated films formed into a bag shape by thermally welding the inner layer films to each other.

To solve the problem described above, a method for manufacturing a laminated film according to the present invention is a method for manufacturing a laminated film, for a pouch, including an intermediate layer film, an inner layer film, and an outer layer film, the intermediate layer film being disposed between the inner layer film and the outer layer film, the pouch being formed with a cut guide line. The method includes preparing the inner layer film and the intermediate layer film layered with an inner adhesive layer therebetween, forming a slit-shaped half-cut portion constituting the cut guide line by inserting a cutter blade, in a film thickness direction, from an outer surface of the intermediate layer film toward an inner surface side of the intermediate layer film until the cutter blade reaches the inner adhesive layer, introducing an adhesive constituting the inner adhesive layer into the half-cut portion to cause the adhesive to be disposed in the half-cut portion formed in the intermediate layer film; and subsequently layering and fixing the outer layer film onto the outer surface side of the intermediate layer film.

According to the invention claimed in claims 1 and 11, by including an interposed adhesive portion constituted by an adhesive interposed between and in contact with a pair of slit-side end surfaces, it is possible to suppress widening of the gap between the pair of slit-side end surfaces, that is, the width of a slit portion caused by bending of the laminated film, for example. Thus, it is possible to favorably facilitate opening using the cut guide line while suppressing a decrease in barrier performance caused by the intermediate layer film.

Further, since the gap between the pair of slit-side end surfaces can be stabilized by the interposed adhesive portion, it is possible to suppress distortion of the shape of the slit-side end surface, that is, distortion of the cut guide line. Thus, it is possible to facilitate opening using the cut guide line.

According to the invention claimed in claim 2, since the slit portion is constituted by a slit-shaped half-cut portion, which is cut from the outer surface of the intermediate layer film toward the inner surface side of the intermediate layer film, it is possible to prevent formation of a melted protrusion, which is formed as a result of the intermediate layer film being melted and bulging from the surface around the slit portion due to laser heat. This occurs, for example, when the slit portion is formed by laser processing. As a result, various states of the intermediate layer film, such as the gap between the pair of slit-side end surfaces, can be easily controlled.

According to the invention claimed in claim 3, since the interposed adhesive portion is constituted by an adhesive identical to the adhesive constituting the inner adhesive layer and is formed continuously with the inner adhesive layer, at a time of manufacturing the laminated film, the interposed adhesive portion can be easily formed by introducing the adhesive constituting the inner adhesive layer into the half-cut portion. Thus, the interposed adhesive portion can be formed while suppressing an increase in manufacturing load.

Further, according to the invention claimed in claim 3, since the slit portion is constituted by the slit-shaped half-cut portion, which is cut from the outer surface of the intermediate layer film so as to reach the inner adhesive layer, compared with a case where the slit portion is formed by laser processing or the like, the gap between the slit-side side surfaces on the inner adhesive layer side, that is, on the deep end side in a cutting direction, becomes narrower. This makes it easier for the capillary phenomenon to occur. The capillary phenomenon causes the adhesive constituting the inner adhesive layer to be introduced into the gap between the slit-side end surfaces. Thus, a state where the adhesive is disposed in the slit portion formed in the intermediate layer film can be obtained without increasing manufacturing load.

According to the invention claimed in claim 4, since the interposed adhesive portion is constituted by the adhesive identical to the adhesive constituting the inner adhesive layer and the outer adhesive layer and is formed continuously with the inner adhesive layer and the outer adhesive layer, at the time of manufacturing the laminated film, it is possible to introduce the adhesive constituting the outer adhesive layer, in addition to the adhesive constituting the inner adhesive layer, into the half-cut portion. Thus, the interposed adhesive portion can be easily and reliably formed while suppressing an increase in the manufacturing load.

According to the invention claimed in claim 5, since the adhesive constituting the interposed adhesive portion is constituted by a solvent-free adhesive that has a high fluidity in a pre-curing state and is in a range from 2000 to 30000 mPa·S/25° C., at the time of manufacturing the laminated film, the adhesive constituting the inner adhesive layer can be favorably guided to the half-cut portion while preventing the adhesive from dripping and adhering to peripheral equipment or the like.

According to the invention claimed in claim 6, since the adhesive constituting the interposed adhesive portion is formed to entirely fill the inside of the slit portion, the above-described effects of suppressing the deterioration in the barrier performance and stabilizing the shape of the cut guide line, which are achieved by the formation of the interposed adhesive layer, can be favorably obtained.

According to the invention claimed in claim 7, since the gap between the pair of slit-side end surfaces on the outer surface side of the intermediate layer film is 20 μm or less over the entire region, in the longitudinal direction, of the cut guide line, it is possible to favorably suppress a decrease in the barrier performance caused by the intermediate layer film.

Further, according to the invention claimed in claims 8 to 10, after forming the half-cut portion by inserting a cutter blade from the outer surface of the intermediate layer film into the intermediate layer film layered on the inner layer film via the inner adhesive layer, the gap between the pair of slit-side end surfaces can be maintained to be narrow by causing the intermediate layer film to follow the motion of the shape recovery of the inner layer film, which has been elastically deformed by being pressed by the cutter blade.

According to the invention claimed in claim 12, the inner layer film and the intermediate layer film layered with the inner adhesive layer therebetween are prepared, the slit-shaped half-cut portion constituting the cut guide line is formed by inserting the cutter blade, in the film thickness direction, from the outer surface of the intermediate layer film toward the inner surface side of the intermediate layer film until the cutter blade reaches the inner adhesive layer, the adhesive constituting the inner adhesive layer is introduced into the half-cut portion to cause the adhesive to be disposed in the half-cut portion formed in the intermediate layer film, and subsequently, the outer layer film is laminated and fixed onto the outer surface side of the intermediate layer film. In this manner, by introducing the adhesive constituting the inner adhesive layer so as to cause the adhesive to be disposed in the half-cut portion formed in the intermediate layer film, a state can be achieved where the adhesive is disposed in the half-cut portion formed in the intermediate layer film, while suppressing an increase in the manufacturing load.

Further, according to the invention claimed in claim 12, by performing processing to form the half-cut portion in a state where the inner layer film and the intermediate layer film are layered onto each other, the following formability problem can be avoided. That is, after forming a cut section, which serves as the half-cut portion, in the intermediate layer film in a single-layered state, when an attempt is made to layer the inner layer film or the like on the cut section, if portions around the cut sections of the intermediate layer films overlap each other in the vertical direction at a time of bonding, an appearance defect occurs as a result of a backbone-like bulging portion being formed at a time of winding. As a result, a formability problem occurs, such as slackening that needs to be adjusted for every batch of raw material. With the invention claimed in claim 12, by performing the processing to form the half-cut portion in the state where the inner layer film and the intermediate layer film are layered on each other, such a formability problem can be avoided.

Further, according to the invention claimed in claim 13, by introducing the adhesive constituting the inner adhesive layer into the half-cut portion by the capillary phenomenon, a state where the adhesive is disposed in the half-cut portion formed in the intermediate layer film can be obtained without increasing manufacturing load.

Further, according to the invention claimed in claim 13, by forming the slit-shaped half-cut portion constituting the cut guide line by inserting the cutter blade, in the film thickness direction, from the outer surface of the intermediate layer film toward the inner surface side of the intermediate layer film, compared with a case where the half-cut portion is formed by laser processing or the like, the gap between the slit-side side surfaces on the inner adhesive layer side, that is, on the deep end side in the cutting direction, becomes narrower, and the above-described capillary phenomenon can thus be favorably generated.

According to the invention claimed in claim 14, by causing the viscosity of the adhesive to be in a range from 2000 to 30000 mPa·S at a time when the adhesive constituting the inner adhesive layer is introduced into the half-cut portion, at the time of manufacturing the laminated film, the adhesive constituting the inner adhesive layer can be favorably guided to the half-cut portion while preventing the adhesive from dripping and adhering to peripheral equipment or the like.

DESCRIPTION OF EMBODIMENTS

A pouch 10 according to an embodiment of the present invention will be described below with reference to the drawings.

Figure 1:
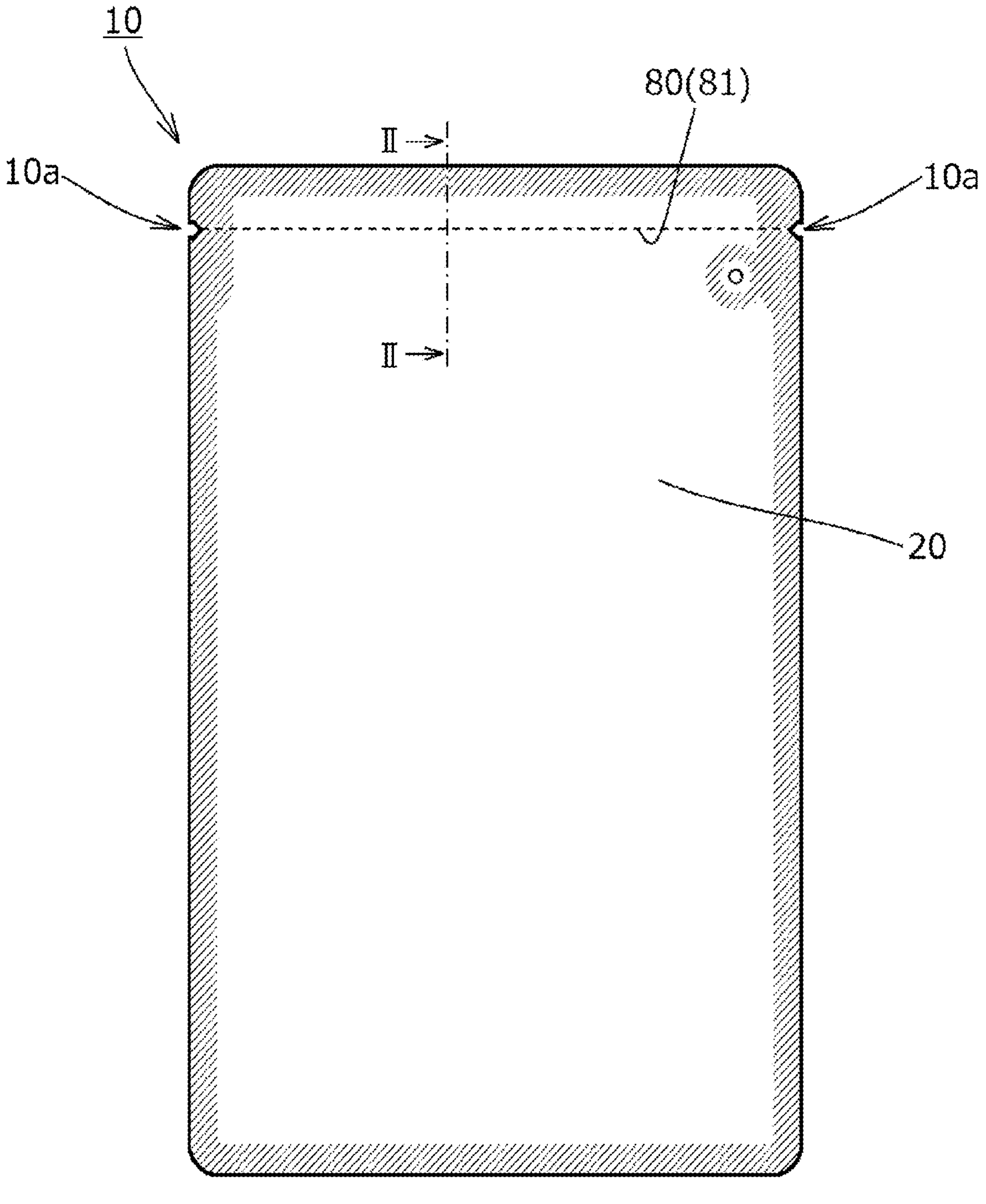
FIG. 1 is a plan view illustrating a pouch according to an embodiment of the present invention.
Figure 2:
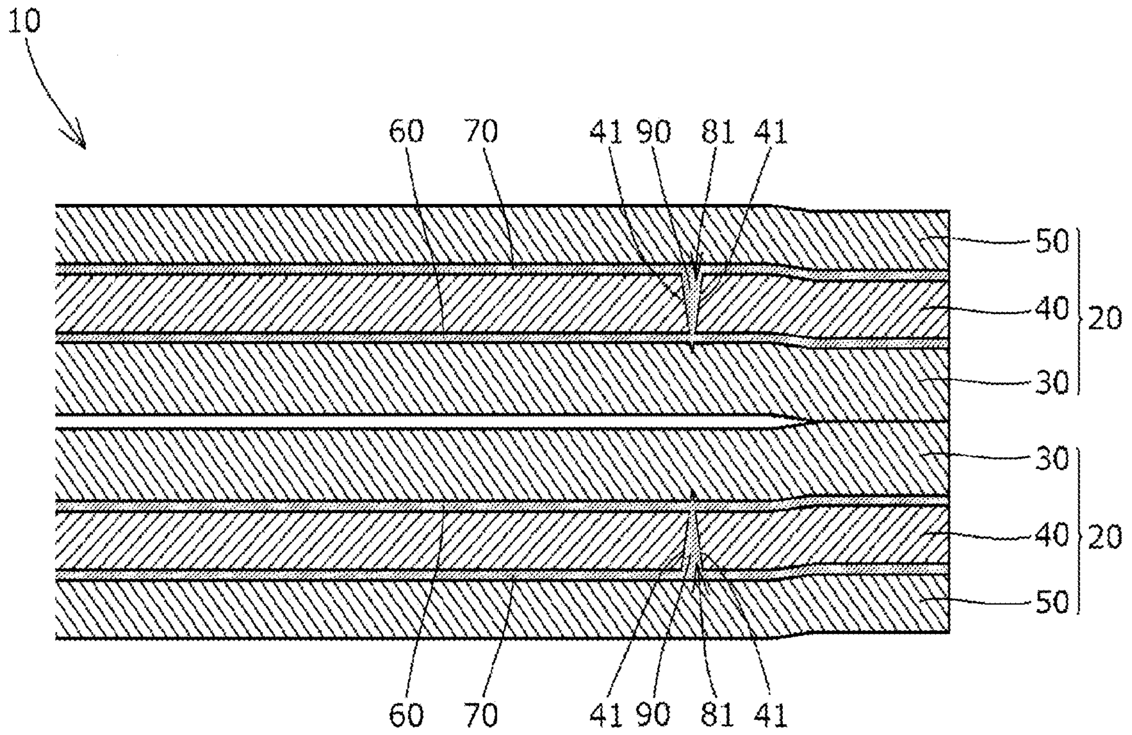
FIG. 2 is a cross-sectional view of the pouch taken along the line II-II illustrated in FIG. 1 when viewed in the direction of the arrows.

As illustrated in FIGS. 1 and 2, the pouch 10 is formed into a bag shape by forming an outer edge seal portion (heat-sealed portion) that is obtained by thermally welding inner layer films 30 of stacked laminated films 20 at outer edges of the stacked laminated films 20. The pouch 10 is designed to accommodate food or the like in an accommodating portion formed inside the pouch 10.

As illustrated in FIG. 2, each of the laminated films 20 includes the inner layer film 30 disposed on the innermost side of the pouch 10, an intermediate layer film 40 formed on the outer surface side of the inner layer film 30, an outer layer film 50 formed on the outer surface side of the intermediate layer film 40, an inner adhesive layer 60 that bonds the inner layer film 30 and the intermediate layer film 40 together, an outer adhesive layer 70 that bonds the intermediate layer film 40 and the outer layer film 50 together, a cut guide line 80 constituted by a slit portion (half-cut portion) 81 for guiding cutting (opening) when a user opens the pouch 10, and an interposed adhesive portion 90 made of an adhesive interposed between slit-side end surfaces 41 of the intermediate layer film 40.

Each of the constituent elements will be more specifically described below with reference to the drawings.

Inner Layer Film 30

First, the inner layer film 30 will be described as follows.

The inner layer film 30 is formed as a so-called sealant film. As illustrated in FIG. 2, each of the inner layer films 30 is disposed on the innermost side facing the other laminated film 20 in a state where the pouch 10 is formed into the bag shape, and is thermally welded to the inner layer film 30 of the other laminated film 20.

As the material of the inner layer film 30, various known materials can be used. For example, polyolefin having heat sealability can be used.

Examples of such polyolefin include low-density, medium-density or high-density polyethylene, linear low-density polyethylene, isotactic polypropylene, syndiotactic polypropylene, ethylene-propylene copolymer, polybutene-1, poly(4-methyl-1-pentene), ethylene-butene-1 copolymer, propylene-butene-1 copolymer, ethylene-propylene-butene-1 copolymer, ethylene-vinyl acetate copolymer, ion-crosslinked olefin copolymer (ionomer), and ethylene-acrylic ester copolymer.

These materials can be used alone or in combination of two or more as a blended material.

In particular, from the viewpoint of heat resistance, a propylene-based polymer is suitable, and homo-polypropylene, or a random copolymer or a block copolymer mainly composed of propylene can be used.

Further, the inner layer film 30 may be formed as one layer, or may be formed by layering two or more layers made of different materials.

Figure 3A:
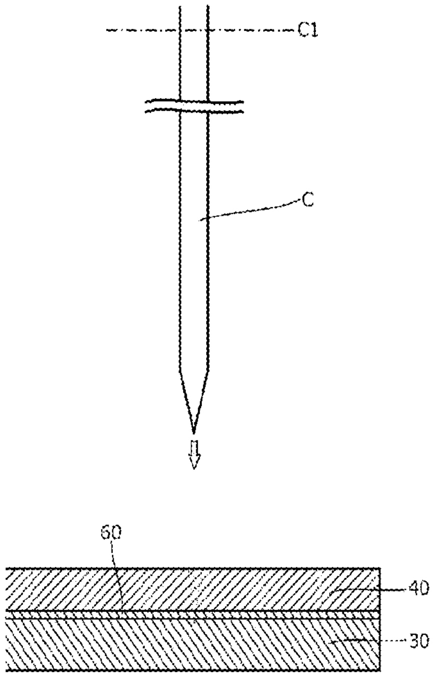
FIGS. 3(*a*) and 3(*b*) are explanatory diagrams illustrating a method for manufacturing a laminated film.
Figure 3B:
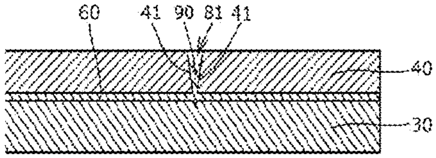
Figure 4A:
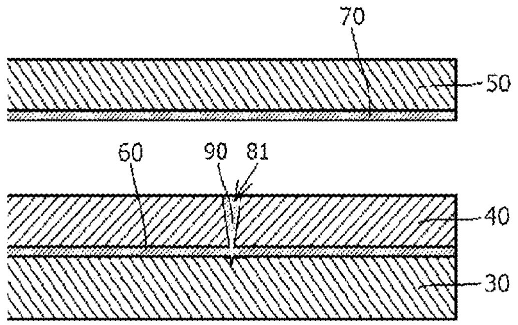
FIGS. 4(*a*) and 4(*b*) explanatory diagrams illustrating the method for manufacturing the laminated film.
Figure 4B:
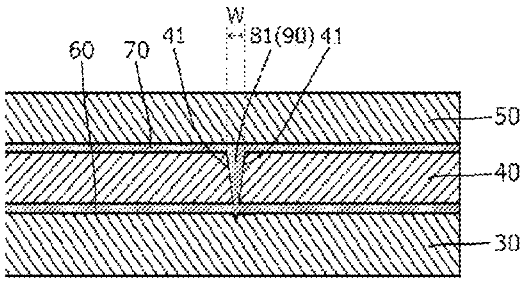

Here, from the viewpoint of keeping a width W of the slit portion (half-cut portion) 81 illustrated in FIGS. 4(*a*) and 4(*b*) (i.e., a gap W between the pair of slit-side end surfaces 41 on the outer surface side of the intermediate layer film 40) narrow, the inner layer film 30 is preferably formed so that the tensile elastic modulus of the inner layer film 30 is 0.9 GPa or less. That is, when the tensile elastic modulus of the inner layer film 30 is set to 0.9 GPa or less, as illustrated in FIGS. 3(*a*) and 3(*b*), after forming the slit portion (half-cut portion) 81 by inserting a cutter blade C from the outer surface of the intermediate layer film 40, the shape of the inner layer film 30, elastically deformed by being pressed by the cutter blade C, can be favorably restored to its original shape (flat plate shape). Thus, by causing the intermediate layer film 40 to follow the motion of the shape recovery of the inner layer film 30, the gap W between the pair of slit-side end surfaces 41 can be made narrow.

Intermediate Layer Film 40

Next, the intermediate layer film 40 will be described as follows.

The intermediate layer film 40 is disposed between the inner layer film 30 and the outer layer film 50, and is formed as a film having barrier properties such as gas barrier properties, moisture barrier properties, and aroma component barrier properties (aroma retention properties). In the present embodiment, the intermediate layer film 40 includes a base layer and a barrier layer.

As the material of the base layer of the intermediate layer film 40, various known materials can be used, and examples thereof include polyamide and polyester.

Examples of the polyamide include nylon 6, nylon 66, nylon 46, nylon 69, nylon 610, nylon 612, nylon 11, nylon 12, and nylon MXD6. From the viewpoint of ease of handling, nylon 6 or nylon 66 is preferable.

As the polyester, a condensation polymer, which is obtained by polymerization of monomers containing an aromatic dicarboxylic acid or an aliphatic dicarboxylic acid, and a diol, as components, such as polyethylene terephthalate (PET) and polybutylene terephthalate (PBT), is preferable.

Among them, polybutylene terephthalate (PBT) or polyethylene terephthalate (PET) having low hygroscopicity, or a blended material thereof is particularly preferably used.

Note that the intermediate layer film 40 may be formed as one layer (base layer), or may be formed by layering two or more layers (base layers).

Further, the barrier layer of the intermediate layer film 40 is a layer for imparting, to the laminated film 20, various barrier properties such as gas barrier properties and moisture barrier properties. In the present embodiment, the barrier layer is formed as a vapor-deposited layer in which an inorganic substance or an inorganic oxide, such as aluminum oxide (alumina, $Al_2O_3$), silicon (Si), or aluminum (Al), is vapor-deposited on the outer surface side of the base layer. Note that the type of the barrier layer is not specifically limited to the vapor-deposited layer as described above. Any layer may be used as the barrier layer as long as it can impart various barrier properties. For example, a resin film such as polyvinylidene chloride, polyacrylonitrile, or an ethylene vinyl alcohol copolymer may be bonded to the base layer as the barrier layer.

Further, in the present embodiment, the barrier layer of the intermediate layer film 40 is formed on the outer surface side of the base layer, but the position at which the barrier layer is formed is not limited thereto. For example, the barrier layer may be formed on the inner surface side of the base layer.

Further, as the barrier layer of the intermediate layer film 40, only one of the barrier layers may be formed, or two or more of the barrier layers may be formed at arbitrary positions.

As illustrated in FIG. 2, in the intermediate layer film 40, the slit portion (half-cut portion) 81 is formed extending through the intermediate layer film 40 in the film thickness direction (from the outer surface side to the inner surface side of the intermediate layer film 40), namely, so as to cut the barrier layer described above.

Accordingly, as illustrated in FIG. 2, the intermediate layer film 40 includes the pair of slit side end surfaces 41 facing the slit portion (half-cut portion) 81, and facing each other with the slit portion (half-cut portion) 81 therebetween.

As will be described in detail later, the adhesive constituting the interposed adhesive portion 90 is disposed between the pair of slit-side end surfaces 41.

Note that, in the above description, the intermediate layer film 40 is formed of a multilayer structure including the base layer and the barrier layer, but the specific type of the intermediate layer film 40 may be any type as long as the intermediate layer film 40 has barrier properties. For example, the intermediate layer film 40 may have a single-layer structure formed of a material having barrier properties, such as polyester having aroma component barrier properties (aroma retention properties).

Outer Layer Film 50

Next, the outer layer film 50 will be described as follows.

First, as the material of the outer layer film 50, various known materials can be used, and examples thereof include polyamide and polyester.

Examples of the polyamide include nylon 6, nylon 66, nylon 46, nylon 69, nylon 610, nylon 612, nylon 11, nylon 12, and nylon MXD6. From the viewpoint of ease of handling, nylon 6 or nylon 66 is preferable.

As the polyester, a condensation polymer, which is obtained by polymerization of monomers containing an aromatic dicarboxylic acid or an aliphatic dicarboxylic acid, and a diol, as components, such as polyethylene terephthalate (PET) and polybutylene terephthalate (PBT), is preferable.

Among them, PBT and PET are particularly preferable.

Further, when nylon or PBT is used for the outer layer film, a biaxially stretched film formed by a tubular method is preferable.

This is because the biaxially stretched film has high isotropy in addition to properties such as strength, heat resistance, and transparency, and thus a difference in quality due to the position where the film is taken up is unlikely to occur.

Further, the outer layer film 50 may be formed as one layer, or may be formed by layering two or more layers made of different materials.

Further, a barrier layer similar to the barrier layer of the intermediate layer film 40 described above may be formed in the outer layer film 50.

Inner Adhesive Layer 60

Next, the inner adhesive layer 60 will be described as follows.

As illustrated in FIG. 2, the inner adhesive layer 60 is formed between the outer surface of the inner layer film 30 and the inner surface of the intermediate layer film 40, and bonds the outer surface of the inner layer film 30 and the inner surface of the intermediate layer film 40 together.

An adhesive constituting the inner adhesive layer 60 is composed of a solvent-free adhesive, which will be described later in detail.

From the viewpoint of keeping the width W of the slit portion (half-cut portion) 81 illustrated in FIGS. 4(*a*) and 4(*b*) narrow, the adhesive constituting the inner adhesive layer 60 is preferably an adhesive having an initial shear strength of 0.1 N/15 mm or more. That is, when the inner adhesive layer 60 is formed of an adhesive having an initial shear strength of 0.1 N/15 mm or more, as illustrated in FIGS. 3(*a*) and 3(*b*), after forming the slit portion (half-cut portion) 81 by inserting the cutter blade C from the outer surface of the intermediate layer film 40, the intermediate layer film 40 can be caused to follow the motion of the shape recovery of the inner layer film 30, which has been elastically deformed by being pressed by the cutter blade C, and thus, the gap W between the pair of slit-side end surfaces 41 can be made narrow.

Note that the initial shear strength described above is a shear strength immediately after bonding (immediately after coating and before an aging treatment) measured by a method of measuring the shear strength with the tensile shear load parallel to the bonding surface, under the conditions of a bonded area of 15×15 mm and a tensile speed of 5 mm/min according to the test procedure of JIS K 6850.

Further, from the same viewpoint, the lamination strength between the inner layer film 30 and the intermediate layer film 40 (the lamination strength after the aging treatment for promoting the curing reaction of the adhesive constituting the inner adhesive layer 60) is preferably set to 1.0 N/15 mm or more.

Outer Adhesive Layer 70

Next, the outer adhesive layer 70 will be described as follows.

As illustrated in FIG. 2, the outer adhesive layer 70 is formed between the outer surface of the intermediate layer film 40 and the inner surface of the outer layer film 50, and bonds the outer surface of the intermediate layer film 40 and the inner surface of the outer layer film 50 together.

An adhesive constituting the outer adhesive layer 70 is formed of a solvent-free adhesive, which will be described later in detail.

Here, although a different adhesive from the adhesive constituting the inner adhesive layer 60 (for example, various adhesives including adhesives such as a solvent adhesive other than the solvent-free adhesive) may be used as the adhesive constituting the outer adhesive layer 70. When the adhesive constituting the outer adhesive layer 70 is the same as the adhesive constituting the inner adhesive layer 60, various settings, such as settings for treatment conditions in the aging treatment for promoting the curing of the adhesive, become easier. In addition to this, since the same adhesive can be introduced into the slit portion (half-cut portion) 81 from the outer surface side of the intermediate layer film 40 by the capillary phenomenon or the like, the slit portion (half-cut portion) 81 can be reliably filled with the same adhesive.

Solvent-Free Adhesive

Next, the solvent-free adhesive constituting the adhesive layers 60 and 70 will be described as follows.

First, the solvent-free adhesive constituting the adhesive layers 60 and 70 is a two-part reaction curable adhesive composed of a main agent and a curing agent to be described below.

As the main agent constituting the solvent-free adhesive, it is preferable to use a polyester-based resin having good adhesion to the films 30, 40, and 50 and excellent lamination strength and impact resistance, and a polyester polyol resin is particularly preferable.

The polyester polyol resin may be produced by an esterification reaction between a polybasic acid such as succinic acid, adipic acid, azelaic acid, sebacic acid, phthalic acid, isophthalic acid, or terephthalic acid and a polyhydric alcohol such as ethylene glycol, 1,2-propanediol, 1,3-butanediol, 1,4-butanediol, 3-methyl-1, 5-pentanediol, 1,6-hexanediol, 1,4-cyclohexanedimethanol, neopentyl glycol, 3,3-bis(hydroxymethyl)heptane, diethylene glycol, dipropylene glycol, glycerin, or trimethylolpropane.

Specific examples of the polyester polyol resin include (1) adipate-based polyester glycols such as poly(ethylene adipate), poly(diethylene adipate), poly(propylene adipate), poly(tetramethylene adipate), poly(hexamethylene adipate), and poly(neopentylene adipate), (2) polycaprolactone-based polyester glycols such as poly-F-caprolactone, and (3) other polyester polyol resins such as poly(hexamethylene sebacate) and poly(hexamethylene carbonate).

Further, in addition to the polyester-based resin, for example, a polyurethane-based compound may be contained as the main agent. By using such a main agent (when an ink layer is provided in contact with the adhesive layers 60 and 70), adhesion to the ink layer can be ensured because the ink layer usually contains a urethane component.

The number average molecular weight of the resin constituting the main agent is preferably 400 to 1500, and more preferably 500 to 1000. When the number average molecular weight of the resin constituting the main agent is less than 400, the viscosity of the solvent-free adhesive decreases, and as a result, suitability for continuous lamination may deteriorate when manufacturing the laminated film 20. Further, since the number of terminal reactive groups increases, it is necessary to increase the amount of the curing agent. As a result, there is a problem in that the hardness of the obtained adhesive layers 60 and 70 increases due to an increased amount of cross-links and the impact resistance of the adhesive layers 60 and 70 deteriorates. On the other hand, when the number average molecular weight of the resin constituting the main agent is more than 1500, the impact resistance of the obtained adhesive layers 60 and 70 is improved, but the viscosity of the solvent-free adhesive increases. As a result, a wetting failure may occur when applying the solvent-free adhesive, thereby causing an appearance defect or reduction in the lamination strength of the obtained laminated film 20.

As the curing agent constituting the solvent-free adhesive, it is preferable to use an isocyanate compound, particularly a mixture of an aliphatic isocyanate and an araliphatic diisocyanate.

As the aliphatic isocyanate constituting the curing agent, butane-1,4-diisocyanate, 1,6-hexamethylene diisocyanate (HDI), isopropylene diisocyanate, methylene diisocyanate, 2,2,4-trimethylhexamethylene diisocyanate, m-tetramethylxylylene diisocyanate, lysine diisocyanate, dimer diisocyanate obtained by converting a carboxyl group of dimer acid into an isocyanate group, and the like can be used alone or in combination of two or more thereof. Among them, 1,6-hexamethylene diisocyanate (HDI) is preferable.

Examples of the aromatic aliphatic diisocyanate constituting the curing agent include 1,3-xylene diisocyanate, 1,4-xylene diisocyanate, or their mixtures (XDI), 1,3-tetramethylxylene diisocyanate, 1,4-tetramethylxylene diisocyanate, or their mixtures (TMXDI), and ω,ω'-diisocyanate-1,4-diethylbenzene.

The number average molecular weight of the resin constituting the curing agent is preferably 400 to 1500, and more preferably 500 to 1000. When the number average molecular weight of the resin constituting the curing agent is less than 400, the viscosity of the solvent-free adhesive decreases, and as a result, suitability for continuous lamination may deteriorate when manufacturing the laminated film. Further, since the number of terminal reactive groups increases, it is necessary to increase the amount of the main agent. As a result, there is a problem in that the hardness of the obtained adhesive layers 60 and 70 increases due to an increased amount of cross-links and the impact resistance of the adhesive layers 60 and 70 deteriorates. On the other hand, when the number average molecular weight of the resin constituting the curing agent is more than 1500, the impact resistance of the obtained adhesive layers 60 and 70 is improved, but the viscosity of the solvent-free adhesive increases. Thus, a wetting failure may occur when applying the solvent-free adhesive, thereby causing an appearance defect or reduction in the lamination strength of the obtained laminated film 20.

In the solvent-free adhesive, with respect to 100 parts by mass of the main agent, the curing agent is preferably contained in a range from 30 to 200 parts by mass, and is particularly preferably in a range from 30 to 70 parts by mass. When the ratio of the curing agent is too small, the obtained adhesive layers 60 and 70 are insufficiently cross-linked, and the lamination strength of the obtained laminated film 20 may deteriorate. On the other hand, when the ratio of the curing agent is too large, the main agent and the curing agent are not sufficiently mixed, and thus the obtained adhesive layers 60 and 70 include a mixture of an insufficiently cross-linked portion and an excessively cross-linked portion. As a result, the lamination strength and the impact resistance of the obtained laminated film 20 may deteriorate.

In the present invention, as the solvent-free adhesive constituting the inner adhesive layer 60 and the outer adhesive layer 70, an adhesive having a viscosity of 2000 to 30000 mPa·S/25° C. (in a state before the aging treatment) is preferably used. When the viscosity of the solvent-free adhesive is less than 2000 mPa·S/25° C., the solvent-free adhesive may drip, or a transfer failure between rolls may occur during coating of the solvent-free adhesive, which results in "transfer unevenness". On the other hand, when the viscosity of the solvent-free adhesive is higher than 30000 mPa·S/25° C., the fluidity of the solvent-free adhesive cannot be ensured. In particular, the capillary phenomenon described later cannot be favorably generated.

The solvent-free adhesive may contain a polyurethane-based compound in addition to the main agent and the curing agent.

The solvent-free adhesive may further contain various additive agents such as a filler, a softener, an antioxidant, a stabilizer, an adhesion promoter, a leveling agent, an anti-foaming agent, a plasticizer, an inorganic filler, a tackifying resin, a fiber, a colorant such as a pigment, or a lifetime extender.

Furthermore, the solvent-free adhesive may contain an adhesion promoter. As the adhesion promoter, a coupling agent such as a silane coupling agent, a titanate-based coupling agent, or an aluminum-based coupling agent, an epoxy resin, or the like can be used.

Specific examples of the silane coupling agent include aminosilanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxysilane, and N-phenyl-γ-aminopropyltrimethoxysilane, epoxysilanes such as 3-(3,4-epoxycyclohexyl)ethyltrimethoxysilane, γ-glycidoxypropyltrimethoxysilane, and γ-glycidoxypropyltriethoxysilane, vinylsilanes such as vinyltris(β-methoxyethoxy)silane, vinyltriethoxysilane, vinyltrimethoxysilane, and γ-methacryloxypropyltrimethoxysilane, hexamethyldisilazane, and γ-mercaptopropyltrimethoxysilane.

Specific examples of the titanate-based coupling agent include tetraisopropoxytitanium, tetra-n-butoxytitanium, butyl titanate dimer, tetrastearyltitanate, titanium acetylacetonate, titanium lactate, tetraoctylene glycol titanate, titanium lactate, and tetrastearoxytitanium.

Specific examples of the aluminum-based coupling agent include acetoalkoxyaluminum diisopropylate.

Specific examples of the epoxy resin include various commercially available epoxy resins such as epibis-type, novolac-type, β-methyl epichlo-type, cyclic oxirane-type, glycidyl ether-type, glycidyl ester-type, polyglycol ether-type, glycol ether-type, epoxidized fatty ester-type, polyvalent carboxylic ester-type, aminoglycidyl-type, and resorcinol-type epoxy resins.

Cut Guide Line 80

Next, the cut guide line 80 will be described as follows.

As illustrated in FIGS. 1 and 2, the pouch 10 is formed with the cut guide line 80, which serves as a weakened portion that is weaker than the portion around the weakened portion. The cut guide line 80 guides the user when cutting (opening) the pouch 10 when the user opens the pouch 10. In the example illustrated in FIG. 1, the cut guide line 80 is formed as a linear portion extending continuously in a straight line in a plan view of the laminated film 20, connecting notches 10*a* formed in both side portions of the pouch 10.

As illustrated in FIG. 1, the notch 10*a* is formed in a notch shape or a slit shape at the outer edge of an outer edge seal portion (heat-sealed portion) used for forming the pouch 10 into a bag, in order to facilitate opening of the pouch 10.

As illustrated in FIG. 2, in at least one (both in the present embodiment) of the front and back laminated films 20, the cut guide line 80 is constituted by the slit portion 81 formed from the outer surface of the intermediate layer film 40 toward the inner surface side of the intermediate layer film 40. In the present embodiment, the cut guide line 80 is constituted by the slit-shaped half-cut portion 81, which is cut from the outer surface of the intermediate layer film 40 toward the inner surface side of the intermediate layer film 40 (cutting of the half-cut portion 81 does not involve any material removal, or involves almost no material removal).

More specifically, as illustrated in FIGS. 3(*a*) and 3(*b*), the half-cut portion 81 is formed from the outer surface of the intermediate layer film 40 toward the inner surface side of the intermediate layer film 40 by inserting the cutter blade C of a cutter (in the example illustrated in FIGS. 4(*a*) and 4(*b*), a rotary cutter rotating about a rotation axis C1) in the film-thickness direction from the outer surface of the intermediate layer film 40 toward the inner surface side of the intermediate layer film 40. The half-cut portion 81 is formed as a slit having a V-shaped (or substantially V-shaped) cross section, so that the width W on the outer surface side of the intermediate layer film 40 is wider than the width on the inner surface side of the intermediate layer film 40.

As illustrated in FIG. 2, the slit portion (half-cut portion) 81 is not formed in the outer layer film 50 (and the outer adhesive layer 70), and the tip of the slit portion (half-cut portion) 81 (a tip portion thereof on the side away from the outer surface of the intermediate layer film 40, that is, the lower end in FIGS. 3(*a*) to 4(*b*)) reaches the inner adhesive layer 60.

Note that, in the example illustrated in FIGS. 3(*a*) to 4(*b*), the tip of the slit portion (half-cut portion) 81 is formed so as to just reach the inner layer film 30, but the tip of the half-cut portion 81 may be formed so as not to reach the inner layer film 30. Further, even when the tip of the slit portion (half-cut portion) 81 is formed so as to reach the inner layer film 30, the slit portion (half-cut portion) 81 is formed so as not to reach the inner surface side of the inner layer film 30.

Here, the width W of the slit portion (half-cut portion) 81 illustrated in FIG. 4(*b*) is preferably set to 20 μm or less, more preferably 10 μm or less over the entire region in the longitudinal direction of the cut guide line 80 in a state where the laminated film 20 (on which the outer layer film 50 is laminated) is in a flat state (specifically, in a state where the laminated film 20 is placed on a flat surface), from the viewpoint of suppressing a deterioration in barrier performance caused by the intermediate layer film 40.

Note that setting the width W of the slit portion (half-cut portion) 81 to 20 μm or less is also desirable from the viewpoint of the design of the pouch 10. That is, when the width W is 20 μm or less, it is difficult to visually determine whether the slit portion (half-cut portion) 81 has been processed, and it is thus possible to prevent the appearance of the pouch 10 from being impaired by the processing.

Further, not only the width W of the slit portion 81 on the outer surface side of the intermediate layer film 40 but also the width of the entire slit portion 81 is preferably set to 20 μm or less (10 μm or less). That is, the width of the inner surface side of the intermediate layer film 40 and also the width of an intermediate portion between the outer surface and the inner surface of the intermediate layer film 40 is preferably set to 20 μm or less (10 μm or less).

Interposed Adhesive Portion 90

Next, the interposed adhesive portion 90 will be described as follows.

As illustrated in FIG. 2, the interposed adhesive portion 90 is a portion made of an adhesive interposed in at least a part (in the present embodiment, the whole) of the slit portion (half-cut portion) 81 formed in the intermediate layer film 40.

In the present embodiment, as illustrated in FIG. 2, the adhesive constituting the interposed adhesive portion 90 is formed so as to entirely fill the inside of the slit portion (half-cut portion) 81.

The adhesive constituting the interposed adhesive portion 90 is interposed in the slit portion (half-cut portion) 81 in a state of being in contact with both of the pair of slit-side end surfaces 41 so as to connect the pair of slit-side end surfaces 41 facing each other with the slit portion (half-cut portion) 81 therebetween. As a result, it is possible to suppress widening of the gap W between the pair of slit-side end surfaces 41 that results from bending or the like of the laminated film 20.

In the present embodiment, the interposed adhesive portion 90 is made of the same adhesive as the adhesive constituting the inner adhesive layer 60, and is formed continuously with the inner adhesive layer 60.

More specifically, it is preferable that the outer adhesive layer 70 be made of the same adhesive as the adhesive constituting the inner adhesive layer 60, and the interposed adhesive portion 90 be made of the same adhesive as the adhesive constituting the inner adhesive layer 60 and the outer adhesive layer 70, and be formed continuously with the inner adhesive layer 60 and the outer adhesive layer 70.

When the pouch 10 is opened, at least one of the pair of slit-side end surfaces 41 can be peeled off from the interposed adhesive portion 90 by a force applied to the laminated film 20. Thus, the interposed adhesive portion 90 does not prevent the laminated film 20 from being cut along the cut guide line 80.

Method for Manufacturing Laminated Film 20

Next, a method for manufacturing the laminated film 20 will be described as follows.

First, as illustrated in FIG. 3(*a*), the inner layer film 30 and the intermediate layer film 40, which are layered with the inner adhesive layer 60 therebetween, are prepared.

Here, in the present embodiment, the inner layer film 30 and the intermediate layer film 40 are bonded to each other by a solvent-free laminating (non-solvent laminating) method using the solvent-free adhesive described above. Specifically, either the outer surface of the inner layer film 30 or the inner surface of the intermediate layer film 40 (in the present embodiment, the inner surface of the intermediate layer film 40) is coated with the solvent-free adhesive constituting the inner adhesive layer 60 (the above-described solvent-free adhesive in which the curing agent is mixed with the main agent), and then the inner layer film 30 and the intermediate layer film 40 are layered and bonded to each other.

Next, as illustrated in FIG. 3(*b*), the cutter blade C is inserted in the film thickness direction from the outer surface of the intermediate layer film 40 toward the inner surface side of the intermediate layer film 40, so as to reach the inner adhesive layer 60, thereby forming the slit portion (half-cut portion) 81. Note that, at this time, the inner layer film 30 and the intermediate layer film 40 are supported by a flat support surface (not illustrated) from the inner surface side of the inner layer film 30.

Here, when forming the slit portion (half-cut portion) 81, the curing reaction of the adhesive constituting the inner adhesive layer 60 has not yet progressed (the aging treatment for promoting the curing reaction has not been performed), and the adhesive is in a fluid state. As illustrated in FIGS. 3(*a*) to 4(*b*), the adhesive constituting the inner adhesive layer 60 is introduced into (enters) the slit portion 81 by the capillary phenomenon, and the adhesive is disposed inside the slit portion 81.

Further, to introduce the adhesive constituting the inner adhesive layer 60 into the slit portion (half-cut portion) 81 by the capillary phenomenon, the viscosity of the adhesive constituting the inner adhesive layer 60 is preferably 30000 mPa·S or less at the time when the adhesive constituting the inner adhesive layer 60 is introduced into the slit portion 81, to ensure the fluidity of the adhesive. More specifically, as the adhesive constituting the inner adhesive layer 60 (solvent-free adhesive), an adhesive having a viscosity of 30000 mPa·S/25° C. or less (before the aging treatment) is preferably used.

Here, in the present embodiment, the temperature of the adhesive constituting the inner adhesive layer 60 is about 25° C. at the time when the adhesive constituting the inner adhesive layer 60 is introduced into the slit portion 81. More specifically, the temperature of the adhesive constituting the inner adhesive layer 60 is about 25° C. from the time when the solvent-free adhesive constituting the inner adhesive layer 60 is applied to either the outer surface of the inner layer film 30 or the inner surface of the intermediate layer film 40, at least up to the time when the outer layer film 50 to be described later is layered on the outer surface side of the intermediate layer film 40. Note that the temperature setting of the adhesive constituting the inner adhesive layer 60 at each time may be set as desired according to the embodiment.

Further, from the viewpoint of preventing the adhesive constituting the inner adhesive layer 60 from dripping and adhering to peripheral equipment or the like, (from the time when the solvent-free adhesive constituting the inner adhesive layer 60 is applied to either the outer surface of the inner layer film 30 or the inner surface of the intermediate layer film 40, at least up to the time when the outer layer film 50 to be described later is layered on the outer surface side of the intermediate layer film 40), the viscosity of the adhesive constituting the inner adhesive layer 60 is preferably 2000 mPa·S or more. More specifically, as the adhesive constituting the inner adhesive layer 60 (solvent-free adhesive), an adhesive having a viscosity of 2000 mPa·S/25° C. or more (before the aging treatment) is preferably used.

Further, conditions other than those described above may be set to cause the above-described capillary phenomenon to occur. For example, the width (cross-sectional area) of the slit portion (half-cut portion) 81 may be set to be narrow enough to cause the capillary phenomenon (capillary phenomenon for introducing the adhesive constituting the inner adhesive layer 60 into the half-cut portion 81) to occur. Alternatively, the material of the intermediate layer film 40 may be determined such that the water repellency of the slit-side end surface 41 is high enough to cause the capillary phenomenon to occur.

Further, as described above, to perform the processing by the cutter blade C in a state where the curing reaction of the adhesive constituting the inner adhesive layer 60 has not yet progressed, it is preferable to dispose equipment for forming the slit portion (half-cut portion) 81 using the cutter blade C, downstream of equipment (not illustrated) for layering and bonding the inner layer film 30 and the intermediate layer film 40, without disposing any processing equipment other than film transport equipment therebetween.

Next, as illustrated in FIG. 4(*a*), the outer layer film 50 whose inner surface side is coated with the adhesive constituting the outer adhesive layer 70 (in the present embodiment, the above-described solvent-free adhesive in which the curing agent is mixed with the main agent) is layered on the outer surface side of the intermediate layer film 40.

In the states illustrated in FIGS. 4(*a*) and 4(*b*), the curing reaction of the adhesive constituting the outer adhesive layer 70 (and the adhesive constituting the inner adhesive layer 60) has not yet progressed, and the adhesive has fluidity.

Further, instead of applying the adhesive constituting the outer adhesive layer 70 to the inner surface side of the outer layer film 50, the adhesive constituting the outer adhesive layer 70 may be applied to the outer surface side of the intermediate layer film 40, and then the intermediate layer film 40 and the outer layer film 50 may be bonded to each other.

Further, from the viewpoint of ensuring the fluidity of the adhesive constituting the outer adhesive layer 70, the viscosity of the adhesive constituting the outer adhesive layer 70 at the time when the outer layer film 50 is layered on the outer surface side of the intermediate layer film 40 is preferably 30000 mPa·S or less to ensure the fluidity of the adhesive. More specifically, as the adhesive constituting the outer adhesive layer 70 (solvent-free adhesive), an adhesive having a viscosity of 30000 mPa·S/25° C. or less (before the aging treatment) is preferably used.

Further, from the viewpoint of preventing the adhesive constituting the outer adhesive layer 70 from dripping and adhering to peripheral equipment, the viscosity of the adhesive constituting the outer adhesive layer 70 is preferably 2000 mPa·S or more at the time when the outer layer film 50 is layered on the outer surface side of the intermediate layer film 40. More specifically, as the adhesive constituting the outer adhesive layer 70 (solvent-free adhesive), an adhesive having a viscosity of 2000 m Pa S/25° C. or more (before the aging treatment) is preferably used.

Next, the aging treatment (curing treatment) for promoting the curing reaction (promoting the curing) of the solvent-free adhesives constituting the adhesive layers 60 and 70 is performed to cure the adhesives. As a result, the laminated film 20 in which the inner layer film 30, the intermediate layer film 40, and the outer layer film 50 are layered and fixed in this order can be manufactured.

The specific temperature setting and treatment time period of the aging (curing) treatment may be determined as required, but it is preferable that the temperature of the aging (curing) treatment be set to 30 to 70° C., and the treatment time period of the aging (curing) treatment be set to 12 to 120 hours.

An embodiment of the present invention has been described in detail above, but the present invention is not limited to the embodiment described above, and various design changes can be made without departing from the scope of the present invention described in the claims. For example, the pouch 10 may be configured by arbitrarily combining respective configurations of the above-described embodiment and embodiments and modified examples to be described below.

For example, the pouch 10 of the present invention is not limited to the four-sided seal type pouch illustrated in FIG. 1 and can be applied to various types of pouches such as a standing pouch, a flat pouch, a three-sided seal type, a pillow type pouch, and a gusset type pouch.

Further, in the above-described embodiment, the cut guide line 80 is formed as the linear portion extending in a straight line, but the specific type of the cut guide line 80 is not limited thereto. For example, when the laminated film 20 is viewed in a plan view, the cut guide line 80 may be formed extending in a curved shape, or may be formed in an intermittently formed dotted line shape.

Further, in the above-described embodiment, one cut guide line 80 is formed, but, for example, a plurality of the cut guide lines 80 may be provided in the laminated film 20 in a state of being arranged parallel to each other.

Further, in the above-described embodiment, the slit portion 81 constituting the cut guide line 80 is constituted by the slit-shaped half-cut portion 81 formed using the cutter blade C, but the specific type of the slit portion 81 is not limited thereto. For example, the slit portion 81 may be formed by laser processing from the outer surface of the intermediate layer film 40 toward the inner surface side of the intermediate layer film 40.

Figure 5:
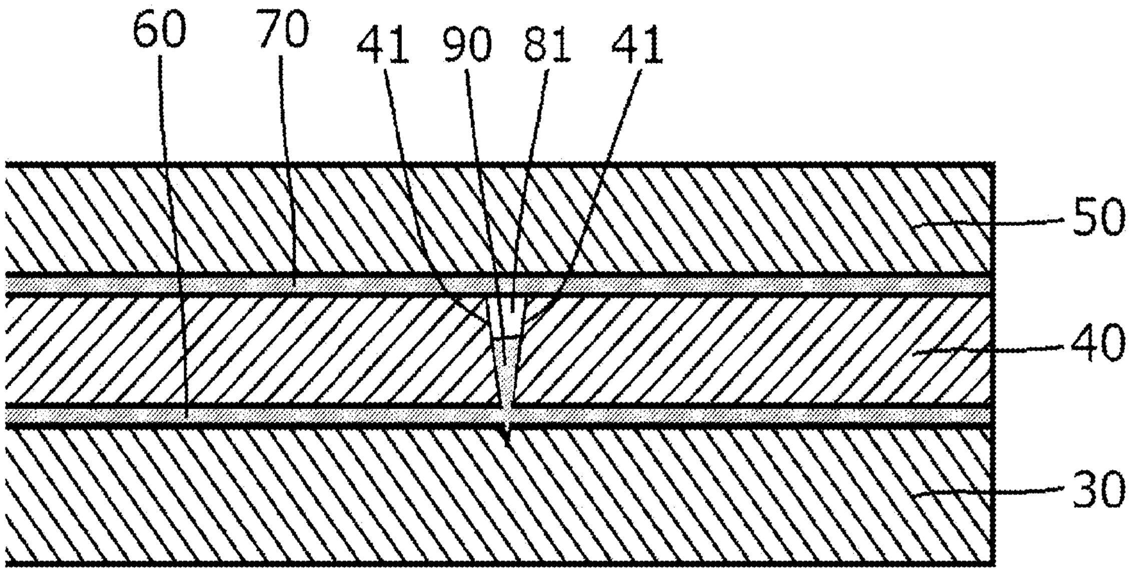
FIG. 5 is an explanatory diagram illustrating a modified example of the laminated film.

Further, in the above-described embodiment, the adhesive constituting the interposed adhesive portion 90 is formed to entirely fill the inside of the slit portion 81, but, as illustrated in FIG. 5, the interposed adhesive portion 90 may be formed such that the adhesive constituting the interposed adhesive portion 90 is disposed only in a part of the slit portion 81. In the example illustrated in FIG. 5, the interposed adhesive portion 90 is formed continuously with the inner adhesive layer 60.

Further, in the above-described embodiment, the adhesive constituting the interposed adhesive portion 90 is formed to entirely fill the inside of the slit portion 81, that is, the interposed adhesive portion 90 is formed to entirely fill the inside of the slit portion 81 over the entire region of the cut guide line 80 in the longitudinal direction of the cut guide line 80. However, the interposed adhesive portion 90 may be formed only in a partial section of the cut guide line 80 in the longitudinal direction of the cut guide line 80.

Further, in the above-described embodiment, the adhesive constituting the inner adhesive layer 60 (and the outer adhesive layer 70) is introduced into the slit portion 81 by the capillary phenomenon, but the adhesive may be introduced into the slit portion 81 by a method other than the capillary phenomenon. For example, the adhesive may be introduced into the slit portion 81 using gravity.

Further, in addition to the adhesive constituting the inner adhesive layer 60 (or the outer adhesive layer 70), an adhesive different from the adhesive constituting the inner adhesive layer 60 (or the outer adhesive layer 70) may be introduced (injected) into the slit portion 81.

Further, in the above-described embodiment, the inner adhesive layer 60 and the outer adhesive layer 70 are formed of the solvent-free adhesive, but the inner adhesive layer 60 and the outer adhesive layer 70 may be formed of an adhesive other than the solvent-free adhesive, such as a solvent adhesive.

Further, in addition to the above-described configuration, an anchor coat layer made of a polyester-based polyurethane resin or a polyether-based polyurethane resin, an overcoat layer (top coat layer) made of a urethane-based resin or a polyester-based resin, a print layer made of printing ink, or the like may be provided as necessary on the laminated film 20.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A laminated film, for a pouch, including an intermediate layer film, an inner layer film, and an outer layer film, the intermediate layer film being disposed between the inner layer film and the outer layer film, the pouch being formed with a cut guide line, wherein the cut guide line is constituted by a slit portion formed from an outer surface of the intermediate layer film toward an inner surface side of the intermediate layer film, the intermediate layer film includes a pair of slit-side end surfaces facing each other with the slit portion therebetween, an interposed adhesive portion constituted by an adhesive interposed between and in contact with both the pair of slit-side end surfaces is provided in at least a part of the slit portion formed in the intermediate layer film, and the inner layer film and the intermediate layer film are bonded to each other by an inner adhesive layer.

2. The laminated film according to claim 1, wherein the slit portion is constituted by a half-cut portion having a slit shape and being cut from the outer surface of the intermediate layer film toward the inner surface side of the intermediate layer film.

3. The laminated film according to claim 2, wherein the half-cut portion is formed from the outer surface of the intermediate layer film to reach the inner adhesive layer, and the interposed adhesive portion is constituted by an adhesive identical to the adhesive constituting the inner adhesive layer and is formed continuously with the inner adhesive layer.

4. The laminated film according to claim 3, wherein the intermediate layer film and the outer layer film are bonded to each other by an outer adhesive layer, the outer adhesive layer is constituted by the adhesive identical to the adhesive constituting the inner adhesive layer, and the interposed adhesive portion is constituted by the adhesive identical to the adhesive constituting the inner adhesive layer and the outer adhesive layer and is formed continuously with the inner adhesive layer and the outer adhesive layer.

5. The laminated film according to claim 3, wherein the adhesive is composed of a solvent-free adhesive in a range from 2000 to 30000 mPa·S/25° C.

6. The laminated film according to claim 1, wherein the adhesive constituting the interposed adhesive portion is formed to entirely fill an inside of the slit portion.

7. The laminated film according to claim 1, wherein a gap between the pair of slit-side end surfaces on the outer surface side of the intermediate layer film is 20 μm or less over an entire region, in a longitudinal direction, of the cut guide line.

8. The laminated film according to claim 2, wherein the inner adhesive layer is constituted by an adhesive having an initial shear strength of 0.1 N/15 mm or more.

9. The laminated film according to claim 2, wherein a lamination strength between the inner layer film and the intermediate layer film is 1.0 N/15 mm or more.

10. The laminated film according to claim 2, wherein a tensile elastic modulus of the inner layer film is set to 0.9 GPa or less.

11. A pouch comprising a plurality of the laminated films described in claim 1 formed into a bag shape by thermally welding the inner layer films to each other.

12. A method for manufacturing a laminated film, for a pouch, the laminated film including an intermediate layer film, an inner layer film, and an outer layer film, the intermediate layer film being disposed between the inner layer film and the outer layer film, the pouch being formed with a cut guide line, the method comprising:

preparing the inner layer film and the intermediate layer film layered with an inner adhesive layer therebetween;

forming a slit-shaped half-cut portion constituting the cut guide line by inserting a cutter blade, in a film thickness direction, from an outer surface of the intermediate layer film toward an inner surface side of the intermediate layer film until the cutter blade reaches the inner adhesive layer;

introducing an adhesive constituting the inner adhesive layer into the half-cut portion to cause the adhesive to be disposed in the half-cut portion formed in the intermediate layer film; and subsequently layering and fixing the outer layer film onto the outer surface side of the intermediate layer film.

13. The method for manufacturing the laminated film according to claim 12, wherein the adhesive constituting the inner adhesive layer is introduced into the half-cut portion by a capillary phenomenon to cause the adhesive to be disposed in the half-cut portion formed in the intermediate layer film.

14. The method for manufacturing the laminated film according to claim 12, wherein a viscosity of the adhesive at a time when the adhesive constituting the inner adhesive layer is introduced into the half-cut portion is set in a range from 2000 to 30000 mPa·S.

* * * * *